United States Patent
Simon et al.

(10) Patent No.: US 6,485,050 B1
(45) Date of Patent: Nov. 26, 2002

(54) AIR BAG COVER ASSEMBLY WITH CURVED HORN REACTION PLATE

(75) Inventors: Gerard K. Simon, Huber Heights, OH (US); Charles D. Griever, Springfield, OH (US); Eric W. Rice, Troy, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/891,804

(22) Filed: Jun. 26, 2001

(51) Int. Cl.[7] ............................................. B60R 21/22
(52) U.S. Cl. ..................................... 280/731; 280/728.3
(58) Field of Search ............................ 280/731, 728.3; 200/61.54, 61.55

(56) References Cited

U.S. PATENT DOCUMENTS

| | | | | |
|---|---|---|---|---|
| 5,265,905 A | * | 11/1993 | Shelton | 280/731 |
| 5,369,232 A | | 11/1994 | Leonelli | 200/61.54 |
| 5,630,617 A | * | 5/1997 | Hashiba | 280/728.3 |
| 5,762,365 A | | 6/1998 | Worrell et al. | 280/731 |
| 5,979,933 A | * | 11/1999 | Murar et al. | 280/728.2 |
| 6,236,309 B1 | | 5/2001 | Haag et al. | 340/438 |

* cited by examiner

Primary Examiner—Eric Culbreth
(74) Attorney, Agent, or Firm—Kathryn A. Marra

(57) ABSTRACT

An air bag cover assembly including a cover element of generally profiled configuration and including one or more mounting posts extending downwardly from the interior surface of the cover element. A reaction plate of generally curved surface contour substantially matching the contour of the inner surface of the cover element is held in place at a position below the cover element. A membrane horn switch is disposed in sandwiched relation between the reaction plate and the cover element. The matching contour of the inner surface of the cover element and the reaction plate establishes a substantially uniform operative separation between the cover element and the membrane horn switch.

21 Claims, 6 Drawing Sheets

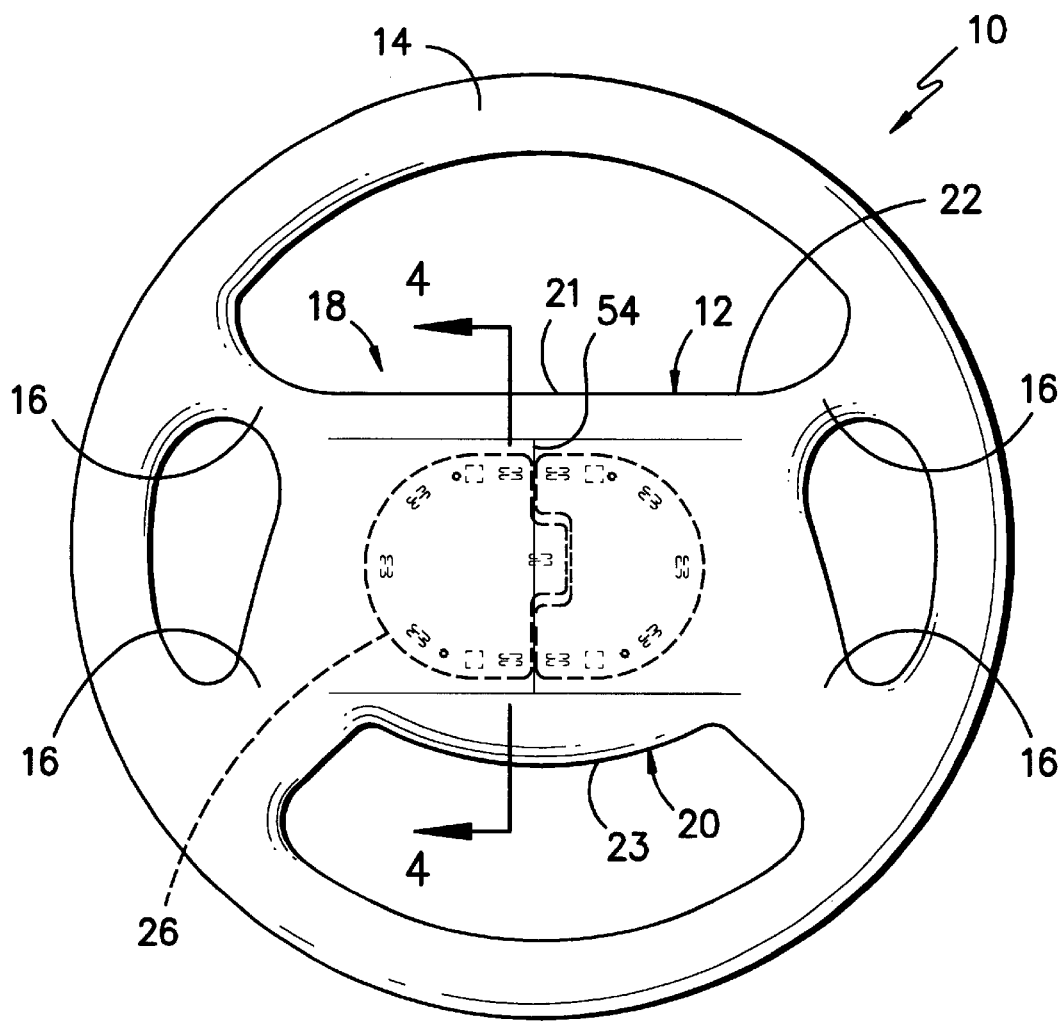
FIG. -1-

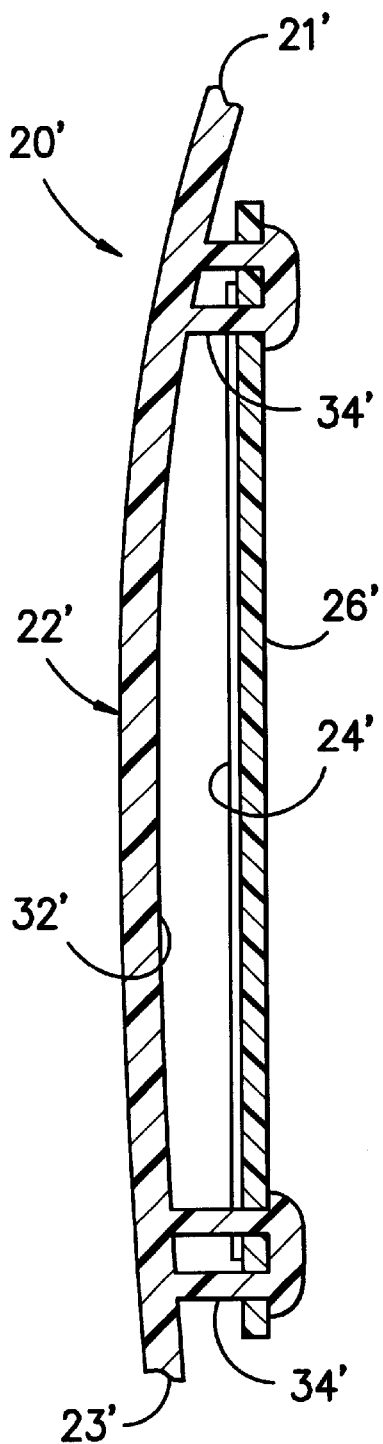
FIG. -2-
PRIOR ART

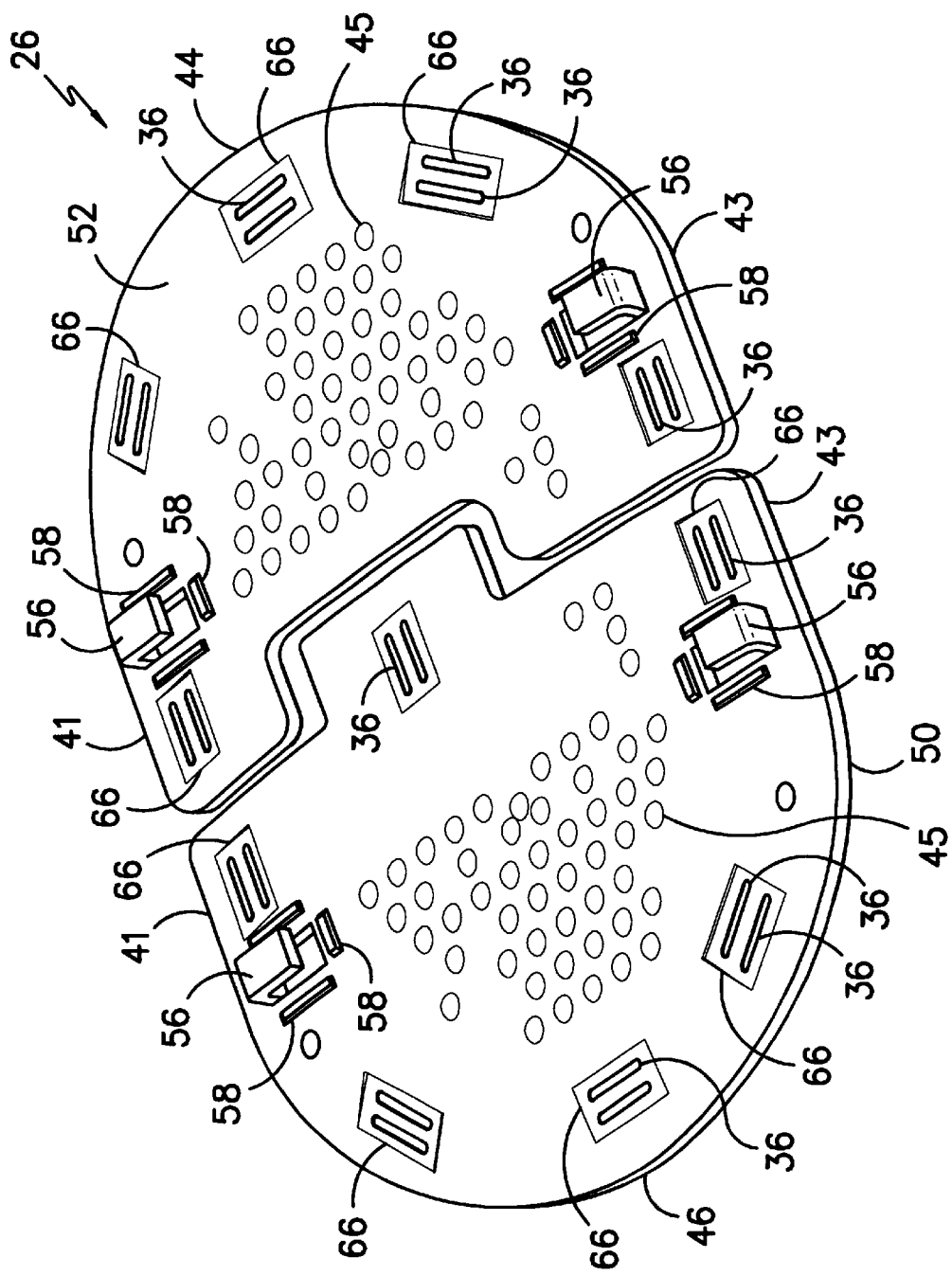
FIG. -3-

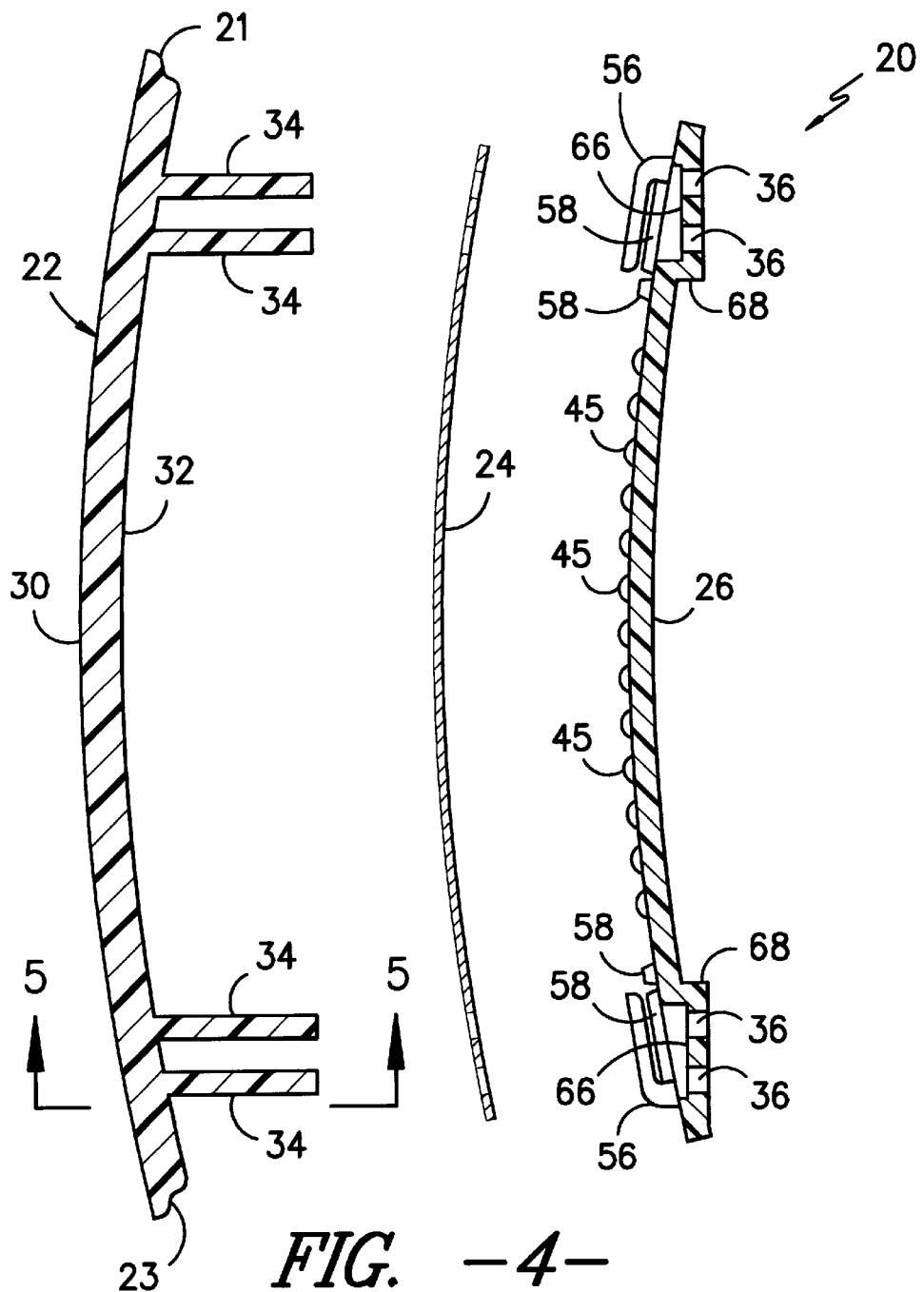
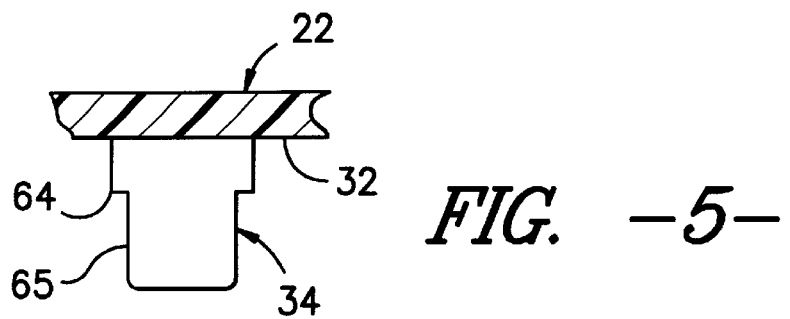
FIG. -4-
FIG. -5-

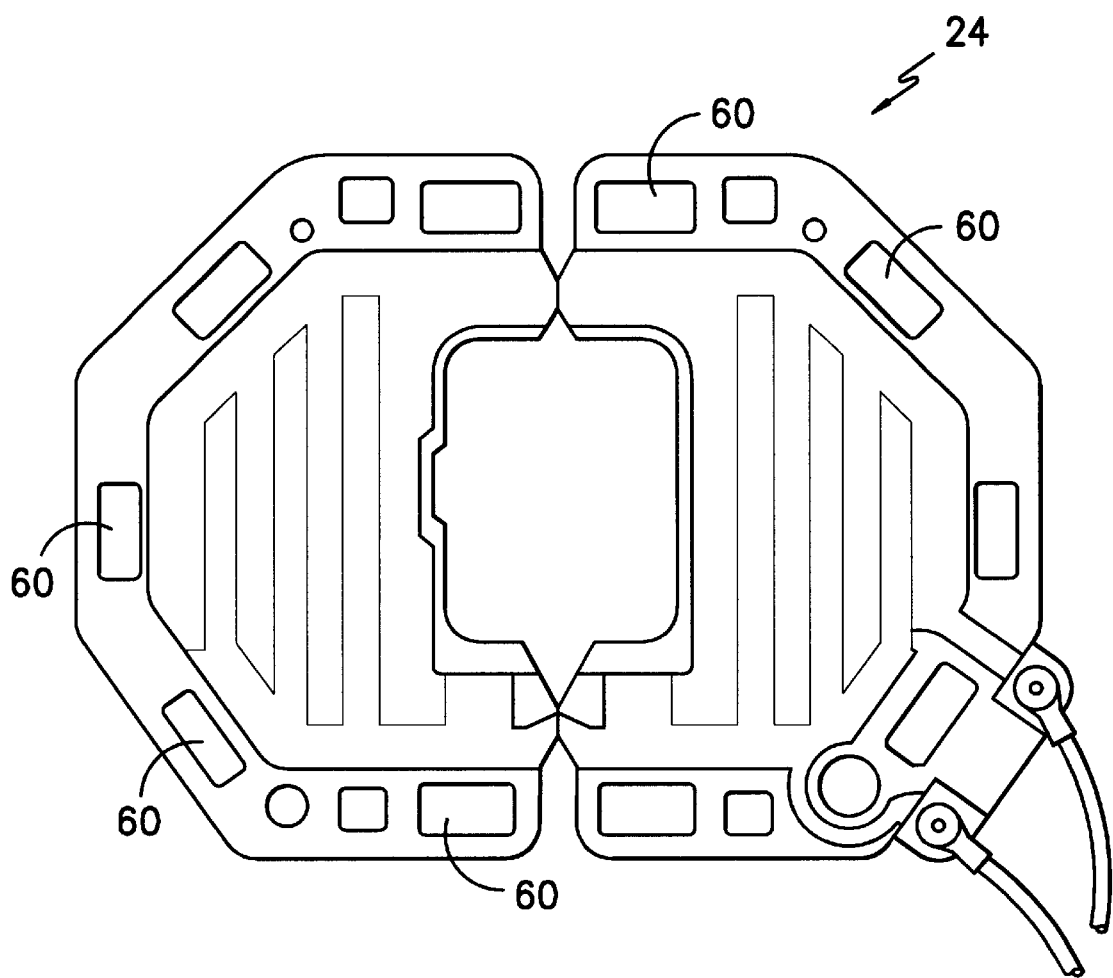
FIG. -6-

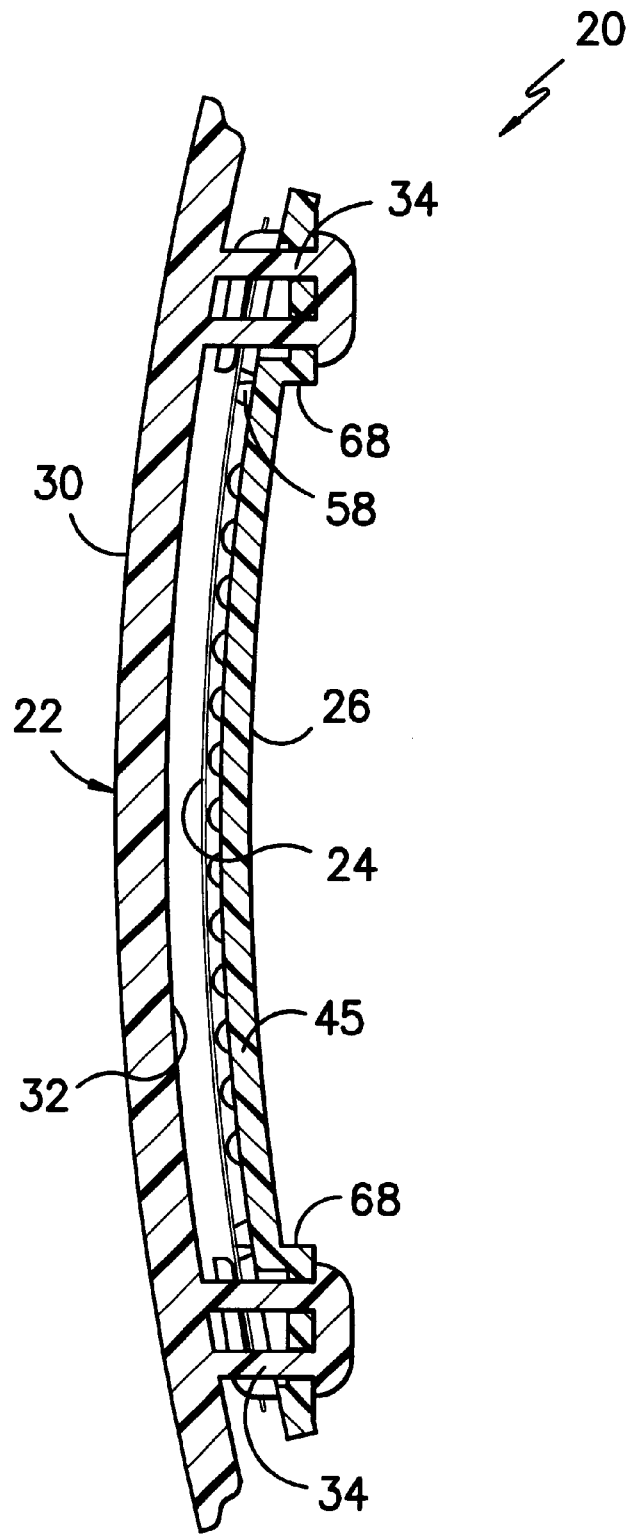
FIG. -7-

AIR BAG COVER ASSEMBLY WITH CURVED HORN REACTION PLATE

TECHNICAL FIELD

The present invention relates to a cover assembly for a vehicle air bag, and more particularly to a cover assembly for use at the interior of a steering wheel on the driver's side of a vehicle which incorporates a contoured cover element, an underlying membrane horn switch and a contoured reaction plate beneath the membrane horn switch. The reaction plate includes an upper surface contoured to substantially match the interior contour of the cover element such that a substantially uniform distance is maintained between the cover element and the horn switch between the upper and lower edges of the cover element.

BACKGROUND OF THE INVENTION

It is well known in motor vehicles to provide an air bag module for protecting a vehicle occupant. It is also generally known to provide an air bag module including an inflatable restraint cushion and an inflator for discharging inflation gas to inflate the cushion upon sensing predetermined vehicle conditions such as deceleration exceeding a certain level. It is also known to provide air bag modules including pressure activated membrane horn switches disposed in sandwiching relationship between a molded depressable cover element and a substantially rigid reaction plate. Such air bag modules are illustrated and described in U.S. Pat. No. 6,236,309 to Haag and U.S. Pat. No. 5,762,365 to Worrell et al. the contents of which are incorporated by reference as if fully set forth herein.

The membrane horn switches conventionally comprise two very thin sheets having conductive coatings which are normally separated by thin spaces. Pressure on the switch forces the conductive surfaces together so as to complete a circuit and thereby actuate the horn. Typically, membrane horn switches are less than about one millimeter in thickness. To actuate the horn, the driver must sufficiently compress the cover member so as to apply the requisite pressure to the membrane horn switch to bring the opposing conducting surfaces together.

The use of a reaction plate in mounted relation to the cover element generally below the membrane horn switch provides a substantially solid surface against which the membrane horn switch can be compressed to actuate the horn. In practice, the reaction plate is typically held in place below the cover element and the membrane horn switch by a plurality of mounting posts which extend away from the interior surface of the cover element through aligned apertures in both the membrane horn switch and the reaction plate. The ends of the posts are melted together to heat stake the reaction plate to the cover. The interior surface of the cover element may also incorporate horn actuating projections which normally extend partially across the space between the interior surface of the cover element and the membrane horn switch. The use of such horn actuating projections reduces the distance the cover element must be compressed in order to actuate the membrane horn switch.

In the past, the reaction plates utilized have been of a generally planar configuration thereby forming a generally flat surface in operative opposing relationship to the interior surface of the cover element. While such a planar surface provides substantially uniform support to the membrane horn switch, the distance between the membrane horn switch and the interior surface of the cover element may vary across the module if the interior surface of the cover element is not also planar.

Recently, cover elements have become more stylized leading to a greater degree of curvature in the outer surface of the cover element facing the occupant. In addition, the use of so called "single shot" injection molding procedures to form the cover elements from a single layer of material has gained popularity. In such "single shot" constructions it is generally desired for the cover element to have a substantially uniform thickness in the regions overlying the, membrane horn switch so as to promote substantially uniform compressibility in those regions. However, in a contoured construction the incorporation of a substantially uniform thickness gives rise to a corresponding contour across the inner surface of the cover element. Such an inner surface contour gives rise to a variation in the distance between the interior surface of the cover element and the membrane horn switch. This differential distance may require the cover element to be depressed to a greater extent in some locations in order to contact and actuate the membrane horn switch.

SUMMARY OF THE INVENTION

The present invention provides advantages and alternatives over the prior art by providing an air bag cover assembly including a cover element of generally profiled configuration and including one or more mounting posts extending downwardly from the interior surface of the cover element. A reaction plate of generally contoured construction substantially matching the contour of the cover element is held in place at a position below the inner surface of the cover element. A membrane horn switch is disposed in sandwiched relation between the reaction plate and the inner surface of the cover element.

According to one aspect of the present invention, an air bag cover assembly is provided including a cover element having a curved exterior show surface and a curved interior surface and wherein a plurality of mounting posts extend downwardly away from the interior surface. A reaction plate of substantially curved contour substantially matching the contour of the inner surface of the cover element is held in place at a position below the inner surface of the cover element by heat staking of the mounting posts. A membrane horn switch is captured between the reaction plate and the interior surface of the cover element such that the distance between the interior surface of the cover element and the membrane horn switch is substantially uniform across the cover assembly.

According to another aspect of the present invention, the reaction plate includes a plurality of apertures for acceptance of mounting posts therethrough. The mounting posts preferably include a shoulder portion which engages a substantially planar shoulder stop in surrounding relation to the post acceptance apertures at the upper surface of the reaction plate. A plurality of protuberant boss elements are disposed across the underside of the reaction plate substantially at the post accepting apertures to facilitate heat staking at those locations. Preferably, the reaction plate is curved in an arched configuration substantially between the forward and aft edges adjacent the upper and lower edges of the air bag module.

The construction according to the present invention is believed to promote an enhanced degree of uniformity in the force required to actuate the membrane horn switch at various locations beneath a curved cover while at the same time facilitating proper alignment and attachment of the component parts thereby improving the manufacturing process. Accordingly, the present intention is believed to provide a useful advancement over the prior art.

BRIEF DESCRIPTION OF THE DRAWINGS

The accompanying drawings which are incorporated in and which constitute a part of this specification illustrate one embodiment of the present invention and, together with the general description of the invention given above, and the detail descriptions set forth below, serve to explain the principles of the invention wherein:

FIG. 1 is a plan view of a steering wheel and air bag cover assembly according to the present invention;

FIG. 2 is a sectional view of an air bag cover assembly according to the prior art;

FIG. 3 is an elevated perspective view of a contoured reaction plate for use in the air bag cover assembly according to the present invention;

FIG. 4 is an exploded sectional view of an air bag cover assembly according to the present invention taken generally along line 4—4 in FIG. 1;

FIG. 5 is a view taken generally along line 5—5 in FIG. 4 and illustrating a mounting post construction for use in the air bag cover assembly according to the present invention;

FIG. 6 is a plan view of a membrane horn switch for use in the air bag cover assembly according to the present invention; and FIG. 7 is a sectional view similar to FIG. 2 illustrating an assembled air bag cover assembly according to the present invention.

While the invention has been illustrated and will hereinafter be described in relation to certain potentially preferred embodiments, practices and procedures, it is to be understood that the invention is in no way to be construed as limited to such embodiments, practices or procedures. To the contrary it is anticipated that modifications may be made and that other embodiments of the principles of the invention may occur to those of skill in the art. Therefore, it is the intent of the applicants to cover all such modifications and embodiments as may incorporate such principles broadly within the true spirit and scope of the invention.

DESCRIPTION OF THE PREFERRED EMBODIMENT

Referring to FIG. 1, a vehicle steering wheel 10 includes a central hub portion 12, a generally circular outer rim portion 14, and a plurality of spokes 16 extending between the hub portion 12 and the rim portion 14. An air bag module 18 is mounted within the hub portion 12 of the steering wheel 10. The air bag module 18 includes an air bag cushion (not shown) and an inflator (not shown) for generating gas to inflate the air bag cushion. The air bag module 18 also includes an air bag cover assembly generally designated as 20.

As best illustrated in FIGS. 1, 3, 4 and 6, the air bag cover assembly 20 includes a cover element 22 including an upper edge 21 and a lower edge 23, a membrane horn switch 24, and a reaction plate 26. It is contemplated that the reaction plate 26 may be of a multi-piece construction if desired so as to facilitate outward deployment of the underlying air bag cushion. Due to the very thin nature of the membrane horn switch 24, the membrane horn switch may be of either a single piece or a multi-piece construction. However, a single piece construction may be preferred to minimize complexity during the assembly process.

In accordance with one aspect of the present invention, the cover element 22 includes a contoured outer show surface 30 (FIG. 4) and a corresponding contoured inner surface 32. A plurality of mounting posts 34 arranged in pairs extend away from locations at the inner surface 32 for insertion through complimentary aligned openings within the membrane horn switch 24 and the reaction plate 26. According to a potentially preferred configuration, both mounting posts 34 in each pair pass through a single opening 60 within the membrane horn switch 24 (FIG. 6) while each of the mounting posts 34 thereafter passes through an aligned discrete reaction plate post acceptance aperture 36 within the reaction plate 26. As illustrated in FIG. 3, the reaction plate post acceptance apertures 36 are preferably arranged in complementary pairs predominantly around the periphery of the reaction plate 26. Following insertion of the mounting posts 34 through the aligned openings within the membrane horn switch 24 and reaction plate 26, the distal ends of the mounting posts 34 may be fused together by heat so as to maintain their assembled positional relationship.

Referring to FIG. 2, a typical prior art air bag cover assembly 20' is illustrated wherein the cover element 22' is of a substantially contoured geometry curved along an surface between the upper edge 21' and a lower edge 23'. In such prior art air bag cover assembly 20', the reaction plate 26' typically has been substantially planar in configuration thereby causing the membrane horn switch 24' to adopt a similar planar orientation. As illustrated, the use of such a substantially flat reaction plate 26' in combination with a curved cover element 22' gives rise to a varying distance between the membrane horn switch 24' and the inner surface 32' of the cover element 22'. This variation in distance between the inner surface 32' and the membrane horn switch 24' may be particularly pronounced in so called "single shot" cover elements which in corporate only a single layer of material. As will be appreciated, a variation in the distance between the membrane horn switch 24' and the cover element 22' may give rise to varying levels of force being required to effect activating contact between the inner surface 32' and the membrane horn switch.

As illustrated in FIGS. 3, 4, and 7, the present invention addresses the deficiencies of the prior art designs through incorporation of an improved reaction plate 26 of a generally contoured curved construction substantially corresponding to the curvature of the inner surface 32 of the cover element 22 across the operative region supporting the membrane horn switch 24. The improved reaction plate 26 further provides enhanced features to facilitate the efficient and effective attachment of the curved construction to the cover element 22.

As best illustrated in FIG. 3, the reaction plate 26 is preferably of a two piece construction having a general plan geometry substantially corresponding to the desired activation area for the membrane horn switch 24. Accordingly, the reaction plate 26 preferably includes an upper plate edge 41 and a lower plate edge 43 for disposition adjacent the upper edge 21 and the lower edge 23 of the cover element 22.

As illustrated, the reaction plate 26 is preferably of a two piece construction including a first segment 50 and a second segment 52 matable to one another at an interior location beneath the cover element 22 such as beneath a central tear seam 54 (FIG. 1) disposed across the cover element 22. Such a segmented construction may reduce the force required to effect outward deployment of an underlined air bag cushion (not shown) while at the same time providing a substantially uniform support surface for the membrane horn switch. Of course, a single piece reaction plate may also be utilized if desired.

In accordance with the present invention, the reaction plate is preferably curved so as to form a generally convex surface between the upper plate edge 41 and the lower plate edge 43. As illustrated, this curvature preferably corresponds substantially to the degree of curvature across the inner surface 32 of the cover element 22 such that upon assembly a substantially uniform distance is maintained between the membrane horn switch 24 and the cover element 22. If desired, the reaction plate 26 may also be slightly curved in the dimension extending between lateral sides 44, 46. However it is believed that such curvature should not be excessive so as to avoid placing undue stress upon the membrane horn switch 24.

According to the potentially preferred embodiment, the membrane horn switch 24 is held in place atop the reaction plate 26 by a plurality of clip elements 56 disposed at the periphery of the reaction plate 26. In assembly, the horn switch may be slid between the clip elements 56 and standoff elements 58 disposed across the surface of the reaction plate 26 in surrounding relation to the clip elements 56. The clip elements 56 and standoff elements 58 thus serve to hold the membrane horn switch 24 at a desired height relative to the surface of the reaction plate.

In addition to the relative height control provided by the clip elements 56 and standoff elements 58, the membrane horn switch 24 is secured against slipping out of position by passing one or both mounting posts 34 through aligned apertures 60 (FIG. 6) at the perimeter of the membrane horn switch 24 in a manner as will be well known to those of skill in the art.

As illustrated in FIGS. 3, 4 and 7, in the illustrated and potentially preferred embodiment the reaction plate 26 preferably includes a plurality of rounded force concentrating projections 45 arranged across the upper surface of the reaction plate 26 and beneath the operative portions of the membrane horn switch 24. As will be appreciated, such projections provide for the concentration of force at substantially discrete points across the membrane horn switch upon the application of pressure. Such force concentration may facilitate the ability to maintain the requisite contact between opposing surfaces in the horn switch even if force is applied across a relatively broad surface by the operator.

One potentially preferred configuration for the membrane horn switch is illustrated in FIG. 6. As shown, in this configuration the membrane horn switch 24 incorporates a plurality of horn switch post acceptance apertures 60. The horn switch post acceptance apertures 60 preferably each accept two mounting posts 34 and are positioned for alignment substantially over the reaction plate post acceptance apertures 36 so as to permit the substantially unobstructed insertion of the mounting posts 34 through both the membrane horn switch 24 and the reaction plate 26 during assembly.

As shown in FIG. 5, the mounting posts 34 preferably include a proximal shoulder portion 64 of enhanced width extending away from the inner surface 32 of the cover element 22. The mounting posts 34 thereafter narrow to a reduced operative width distal portion 65 corresponding substantially to the dimensions of the reaction plate post acceptance apertures 36. Thus, the mounting posts 34 may be inserted through the reaction plate post acceptance apertures 36 until reaching the shoulder portion 64 at which point further insertion is prevented. Conversely, the horn switch post acceptance apertures 60 are of sufficient dimension to permit the complete insertion of all portions of the mounting posts 34 therethrough.

As illustrated, according to the potentially preferred embodiment the reaction plate post acceptance apertures 36 are surrounded by a substantially flat surface zone 66 forming a shoulder stop surface. This substantially flat surface zone 66 is preferably formed as a depression of variable depth across the upper surface of the reaction plate 26 with depth of the depression increasing towards the interior of the reaction plate 26. Such a variable depth depression has been found to be an effective and efficient mechanism to provide a substantially uniform support surface for the shoulder portions 64 of the mounting posts 34. This, in turn, promotes the ability of the shoulder portions 64 to be held in stable supported contact with the substantially flat surface zone 66. The stable interface between the shoulder portions and the substantially flat surface zones 66 promotes the establishment and maintenance of proper relative positioning between the cover element 22 and the reaction plate 26. In addition, the(walls of the depression which surround the shoulder portions 64 assist in establishing proper positioning of the cover element 22 relative to the reaction plate 26 and provide further support against undesired lateral slippage once insertion of the mounting posts 34 has taken place.

As illustrated in FIGS. 4 and 7, the reaction plate 26 preferably also includes a plurality of protuberant boss elements 68 arranged across the lower surface of the reaction plate 26. As shown, these boss elements 68 preferably surround the reaction plate post acceptance apertures 36. The boss elements are preferably substantially flat on their underside and provide a substantially uniform surface for the fusion of the distal ends of the mounting posts 34 thereby locking the elements of the air bag cover assembly 20 in place. In addition, the boss elements 68 also serve to provide an enhanced mass heat sink to absorb excess energy during the fusion of the mounting posts 34 to one another.

It is believed that the present invention provides a new and useful air bag cover assembly useful in applications requiring the use of contoured air bag covers. While specific embodiments of the present invention have been illustrated and described, it is to be understood that the invention is in no way to be limited to such illustrated and described embodiments since modifications may be made and other embodiments of the principles of this invention may occur to those of skill in the art to which this invention pertains. Therefore, it is intended by the appended claims to cover all such modifications and other embodiments as may incorporate the broad principles of this invention within the true spirit and scope thereof.

What is claimed is:

1. An air bag cover assembly comprising:

a cover element including an inner surface of curved geometry and a plurality of mounting posts extending downwardly away from the cover element;

a reaction plate held at a position below the inner surface of the cover element, wherein the reaction plate comprises a lower surface and a curved upper surface, the curved upper surface substantially matching the curvature of the inner surface of the cover element, the reaction plate further comprising a plurality of post acceptance apertures for the receipt of said mounting posts, at least a portion of said post acceptance apertures being disposed within substantially flat surface zones disposed at locations across the upper surface of the reaction plate; and a membrane horn switch captured between the upper surface of the reaction plate and the cover element such that the membrane horn switch assumes a curvature substantially matching the curvature of the inner surface of the cover element whereby a substantially uniform operative distance is maintained between the membrane horn switch and the inner surface of the cover element.

2. The air bag cover assembly as recited in claim 1, wherein the cover element is of a substantially single layered construction.

3. The air bag cover assembly as recited in claim 1, wherein the reaction plate includes an upper plate edge for disposition within the air bag cover assembly substantially adjacent to an upper edge of the cover element, a lower plate edge for disposition within the air bag cover assembly substantially adjacent to a lower edge of the cover element and lateral plate edges extending between the upper plate edge and the lower plate edge and wherein the curved upper surface comprises a raised surface extending in arching relation substantially between the upper plate edge and the lower plate edge.

4. The air bag cover assembly as recited in claim 1, wherein the, reaction plate includes a plurality of protuberant boss elements disposed across the lower surface of the reaction plate at locations generally below the substantially flat surface zones.

5. The air bag cover assembly as recited in claim 1, wherein at least a portion of the substantially flat surface zones comprise variable depth depressions within the curved upper surface of the reaction plate.

6. The air bag cover assembly as recited in claim 5, wherein the reaction plate includes a plurality of protuberant boss elements disposed across the lower surface of the reaction plate at locations generally below the substantially flat surface zones.

7. The air bag cover assembly as recited in claim 6, wherein at least a portion of the protuberant boss elements have a substantially flat surface.

8. The air bag cover assembly as recited in claim 1, wherein the reaction plate includes a plurality of force concentrating projections extending away from the curved upper surface of the reaction plate and towards the membrane horn switch.

9. The air bag cover assembly as recited in claim 1, wherein the reaction plate is of a multi-piece construction.

10. The air bag cover assembly as recited in claim 1, wherein at least a portion of the mounting posts include a distal portion for insertion through an aligned post acceptance aperture and a proximal shoulder portion of greater width than the distal portion and wherein the proximal shoulder portion is of a dimension such that it is obstructed against passage through the aligned post acceptance aperture such that upon complete insertion of the distal portion through the aligned post acceptance aperture the proximal shoulder portion is disposed in supported relation against a portion of a substantially flat surface zone adjacent to the aligned post acceptance aperture.

11. The air bag cover assembly as recited in claim 1, wherein the reaction plate includes at least one clip structure for holding the membrane horn switch against the curved upper surface of the reaction plate.

12. An air bag cover assembly comprising:
a cover element including an inner surface of curved geometry and a plurality of mounting posts extending downwardly away from the cover element;
a reaction plate held at a position below the inner surface of the cover element, wherein the reaction plate comprises a lower surface and a curved upper surface, the curved upper surface substantially matching the curvature of the inner surface of the cover element, the reaction plate further comprising a plurality of post acceptance apertures for the receipt of said mounting posts, at least a portion of said post acceptance apertures being disposed within substantially flat surface zones at the base of variable depth depressions disposed at locations across the upper surface of the reaction plate, at least a portion of the variable depth depressions being disposed in substantially opposing relation to protuberant boss elements disposed across the lower surface of the reaction plate; and
a membrane horn switch captured between the upper surface of the reaction plate and the cover element such that the membrane horn switch assumes a curvature substantially matching the curvature of the inner surface of the cover element whereby a substantially uniform operative distance is maintained between the membrane horn switch and the inner surface of the cover element.

13. The air bag cover assembly as recited in claim 12, wherein at least a portion of the protuberant boss elements have a substantially flat surface.

14. The air bag cover assembly as recited in claim 12, wherein the reaction plate includes a plurality of force concentrating projections extending away from the curved upper surface of the reaction plate and towards the membrane horn switch.

15. The air bag cover assembly as recited in claim 12, wherein the reaction plate is of a multi-piece construction.

16. The air bag cover assembly as recited in claim 12, wherein at least a portion of the mounting posts include a distal portion for insertion through an aligned post acceptance aperture and a proximal shoulder portion of greater width than the distal portion and wherein the proximal shoulder portion is of a dimension such that it is obstructed against passage through the aligned post acceptance aperture such that upon complete insertion of the distal portion through the aligned post acceptance aperture the proximal shoulder portion is disposed in supported relation against a portion of a substantially flat surface zone adjacent to the aligned post acceptance aperture.

17. The air bag cover assembly as recited in claim 12, wherein the reaction plate includes a plurality of clip structures for holding the membrane horn switch against the curved upper surface of the reaction plate.

18. The air bag cover assembly as recited in claim 12, wherein the reaction plate includes an upper plate edge for disposition within the air bag cover assembly substantially adjacent to an upper edge of the cover element, a lower plate edge for disposition within the air bag cover assembly substantially adjacent to a lower edge of the cover element and lateral plate edges extending between the upper plate edge and the lower plate edge and wherein the curved upper surface comprises a raised surface extending in arching relation substantially between the upper plate edge and the lower plate edge.

19. An air bag cover assembly comprising:
a cover element including an inner surface of curved geometry and a plurality of mounting posts extending downwardly away from the cover element, wherein at least a portion of the mounting posts include a distal portion of a first width and a proximal shoulder portion of a second width greater than the distal portion;
a reaction plate held at a position below the inner surface of the cover element, wherein the reaction plate comprises a lower surface and a curved upper surface, the curved upper surface substantially matching the curvature of the inner surface of the cover element, the reaction plate further comprising a plurality of post acceptance apertures for the receipt of the distal portions of said mounting posts, at least a portion of said post acceptance apertures being disposed within substantially flat surface zones for supporting the shoulder portions of said mounting posts, the substantially flat surface zones being disposed at the base of variable depth depressions at locations across the upper surface of the reaction plate, at least a portion of the variable depth depressions being disposed in substantially opposing relation to protuberant boss elements disposed across the lower surface of the reaction plate, the reaction plate further including a plurality of force concentrating projections extending away from the curved upper surface; and a membrane horn switch captured between the reaction plate and the cover element such that the membrane horn switch is supported across the force concentrating projections and assumes a curvature substantially matching the curvature of the inner surface of the cover element whereby a substantially uniform operative distance is maintained between the membrane horn switch and the inner surface of the cover element.

20. The air bag cover assembly as recited in claim 19, wherein the reaction plate includes an upper plate edge for disposition within the air bag cover assembly substantially adjacent to an upper edge of the cover element, a lower plate edge for disposition within the air bag cover assembly substantially adjacent to a lower edge of the cover element and lateral plate edges extending between the upper plate edge and the lower plate edge and wherein the curved upper surface comprises a raised surface extending in arching relation substantially between the upper plate edge and the lower plate edge.

21. The air bag cover assembly as recited in claim 19, wherein the reaction plate includes a plurality of clip structures for holding the membrane horn switch against the curved upper surface of the reaction plate.

* * * * *